No. 626,133. Patented May 30, 1899.
J. & E. T. BASKIN.
HARROW.
(Application filed Sept. 28, 1898.)
(No Model.)

Witnesses:

Inventors:
James Baskin
Edwin T. Baskin
By Edson Bro's
Att'ys.

UNITED STATES PATENT OFFICE.

JAMES BASKIN AND EDWIN T. BASKIN, OF MALTA BEND, MISSOURI.

HARROW.

SPECIFICATION forming part of Letters Patent No. 626,133, dated May 30, 1899.

Application filed September 28, 1898. Serial No. 692,086. (No model.)

*To all whom it may concern:*

Be it known that we, JAMES BASKIN and EDWIN T. BASKIN, citizens of the United States, residing at Malta Bend, in the county of Saline and State of Missouri, have invented certain new and useful Improvements in Harrows; and we do hereby declare the following to be a full, clear, and exact description of the invention, such as will enable others skilled in the art to which it appertains to make and use the same.

Our invention relates to improvements in harrows for pulverizing the clods and cleaning the ground.

It has for its object to promote efficiency and facility of operation and to provide for the ready portability of the machine when not acting upon the soil.

It consists of the peculiar construction and combination and arrangement of the sundry constituent parts, substantially as hereinafter fully disclosed, and specifically pointed out in the claim.

Figure 1:
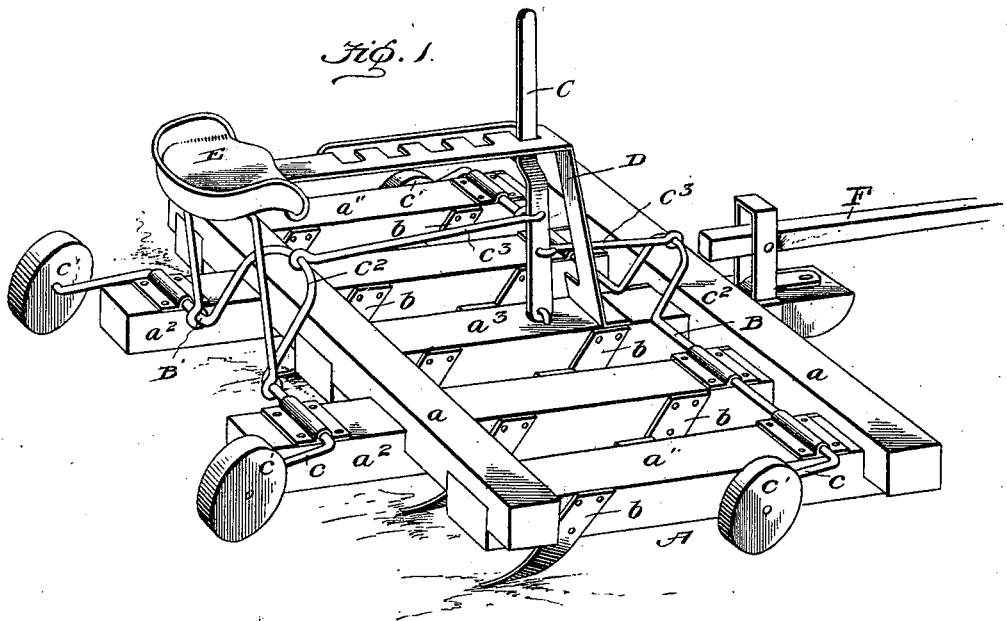
Figure 2:
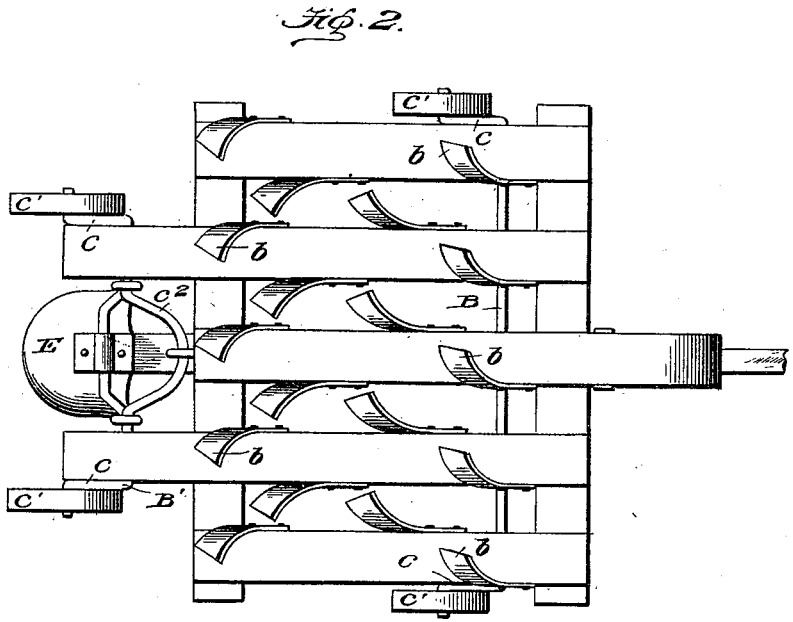

In the accompanying drawings, illustrating the preferred form of carrying out our invention, Figure 1 is a perspective view of our improved harrow. Fig. 2 is an inverted view thereof.

It will be understood that we do not limit ourselves to details of construction and arrangement of the parts, as they may be varied without departing from the spirit or principles of our invention and the same yet remain intact and protected.

A refers to the frame of the harrow, comprising a series of transverse bars $a$ $a$, connecting a series of longitudinal beams or bars $a'$ $a''$, with the two beams $a^2$ next to the lateral beams extended a short distance rearward and the central beam $a^3$ extended forward, the latter designed for greater convenience in the attachment of the tongue, draft-bar, and tongue-slide. The bars or beams $a'$ $a''$ are armed upon the under side or sides with series of harrow teeth or blades $b$ $b$, arranged, preferably, as shown, and individually inclined or laterally curved. Their arrangement and inclination are such that they are adapted to cross-cut or check-row the soil throughout, so as to effectively and exhaustively act upon all of the surface gone over, thus thoroughly pulverizing the clods and uprooting any vegetation in the path of travel. Said arrangement may be described in stating that the series of teeth of each beam is such that the individual teeth alternate with each other from side to side of the beam, all of the teeth being curved or inclined laterally downward and rearward, the inclination, however, of the two forward transverse rows of teeth preferably being the opposite of that of the two rear transverse rows of teeth or blades as to their lateral curvature, the points or lower ends of the teeth or blades looking forward and rearward being such that they will cut or engage and stir the soil or ground in intersecting lines, thus effecting the same in the manner and with the result as above noted.

For effecting the portability of the machine when it is not acting upon the soil we provide forward and rear crank-shafts B B', respectively, applied to the harrow-frame A, with lateral pendent arms $c$ $c$, carrying lateral wheels or trucks $c'$ $c'$, the intermediary cranks or loops $c^2$ $c^2$ of said shafts being connected by links or rods $c^3$ $c^3$ to a hand-lever C, at different points of leverage thereon, said lever being pivoted near the forward crank-shaft to one of the harrow-frame bars or beams.

The lever C is arranged to play or move at a short distance below its upper end in a rack D, secured upon the harrow-frame and adapted to hold said lever at the required point of adjustment, according as to whether the wheels or trucks are elevated or depressed, as will be readily appreciated. Upon the rack D or a rearward extension thereof is suitably mounted and conveniently to the hand-actuated lever C the driver's seat E.

Having thus fully described our invention, what we claim as new, and desire to secure by Letters Patent, is—

In a harrow, the two series of blades or teeth, each series consisting of two rows, the blades of the two front rows deflected or inclined in an opposite direction from those of the two rear rows, the blades of each beam alternating from side to side and spaced apart, and the first or front row of the forward series of blades inclined or deflected oppositely to the back or last row of the second or rear series of blades and the back row of the forward series of blades similarly deflected or inclined to the front row of blades of the second or rear series, substantially as set forth.

In testimony whereof we affix our signatures in presence of two witnesses.

JAMES BASKIN.
EDWIN T. BASKIN.

Witnesses:
C. H. THOMAS,
S. C. MITCHELL.